United States Patent
Gamberini

(10) Patent No.: US 7,328,559 B2
(45) Date of Patent: Feb. 12, 2008

(54) DEVICE FOR CONVEYING CAPSULES CONTAINING AT LEAST ONE PHARMACEUTICAL PRODUCT

(75) Inventor: Ernesto Gamberini, Via Valleverde (IT)

(73) Assignee: MG-2 - S.r.l., Pianoro (IT)

( * ) Notice: Subject to any disclaimer, the term of this patent is extended or adjusted under 35 U.S.C. 154(b) by 0 days.

(21) Appl. No.: 11/519,424

(22) Filed: Sep. 11, 2006

(65) Prior Publication Data

US 2007/0062164 A1 Mar. 22, 2007

(51) Int. Cl.
*B65B 47/00* (2006.01)
(52) U.S. Cl. .................... 53/560; 53/234; 53/502; 53/454
(58) Field of Classification Search ............... 53/234, 53/281, 560, 502, 454; 198/689, 803.13; 177/52, 53, 57
See application file for complete search history.

(56) References Cited

U.S. PATENT DOCUMENTS

| | | | | |
|---|---|---|---|---|
| 4,353,456 A | * | 10/1982 | Yamamoto | 198/384 |
| 4,619,360 A | * | 10/1986 | Taniguchi et al. | 198/471.1 |
| 4,682,683 A | * | 7/1987 | Ackley et al. | 198/384 |
| 5,750,938 A | | 5/1998 | De Caris et al. | |
| 6,189,676 B1 | * | 2/2001 | Ansaloni | 198/399 |
| 7,000,368 B2 | * | 2/2006 | Piemontese | 53/560 |
| 7,082,738 B2 | * | 8/2006 | Konishi et al. | 53/281 |

OTHER PUBLICATIONS

European Search Report for EP 05 42 5632 dated Jan. 30, 2006.
* cited by examiner

*Primary Examiner*—Louis Huynh
(74) *Attorney, Agent, or Firm*—Bryan A. Santarelli; Graybeal Jackson Haley

(57) ABSTRACT

In a device for conveying capsules containing at least one pharmaceutical product, each capsule is fed along a feed line defined by two pocket conveyors connected to each other at a transfer station having a detecting device for determining at least the weight of the pharmaceutical product in the capsule, and is transferred from one pocket conveyor to the other of the feed line with no change in its orientation.

11 Claims, 3 Drawing Sheets

DEVICE FOR CONVEYING CAPSULES CONTAINING AT LEAST ONE PHARMACEUTICAL PRODUCT

PRIORITY CLAIM

This application claims priority from European patent application No. 05425632.6, filed Sep. 9, 2005, which is incorporated herein by reference.

TECHNICAL FIELD

The present invention relates to a device for conveying capsules containing at least one pharmaceutical product.

BACKGROUND

In the pharmaceutical industry, a conveying device is known for feeding a succession of capsules, containing at least one pharmaceutical product, along a given path.

The conveying device comprises a feed line normally defined by a pocket conveyor and a pneumatic conveyor connected to each other at a transfer station. As it travels through the transfer station, each capsule is fed through a detecting device for determining at least the weight of the pharmaceutical product inside the capsule.

Known conveying devices of the above type have various drawbacks, on account of transfer of the capsules from the relative pockets on the pocket conveyor to the pneumatic conveyor involving a change in the orientation of the capsules, and failure of the pneumatic conveyor to convey the capsules with a precise, constant orientation and spacing.

SUMMARY

It is an object of the present invention to provide a device for conveying capsules containing at least one pharmaceutical product, designed to eliminate the aforementioned drawbacks.

According to the present invention, there is provided a device for conveying capsules containing at least one pharmaceutical product, as claimed in the attached claims.

BRIEF DESCRIPTION OF THE DRAWINGS

A non-limiting embodiment of the present invention will be described by way of example with reference to the accompanying drawings.

DETAILED DESCRIPTION

Figure 1:
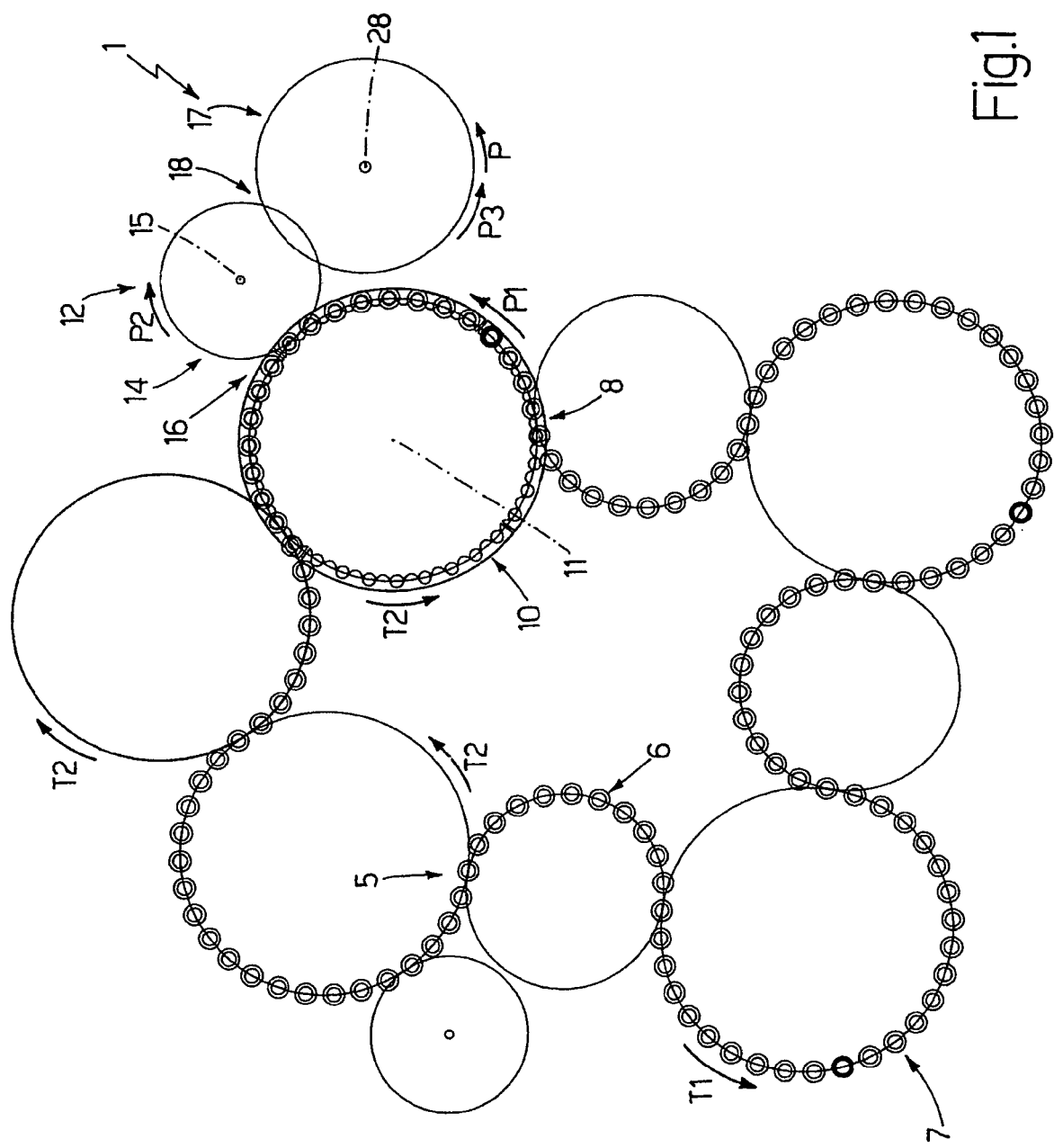
FIG. 1 shows a schematic plan view of a capsule-filling machine featuring a preferred embodiment of the conveying device according to the present invention.
Figure 3:
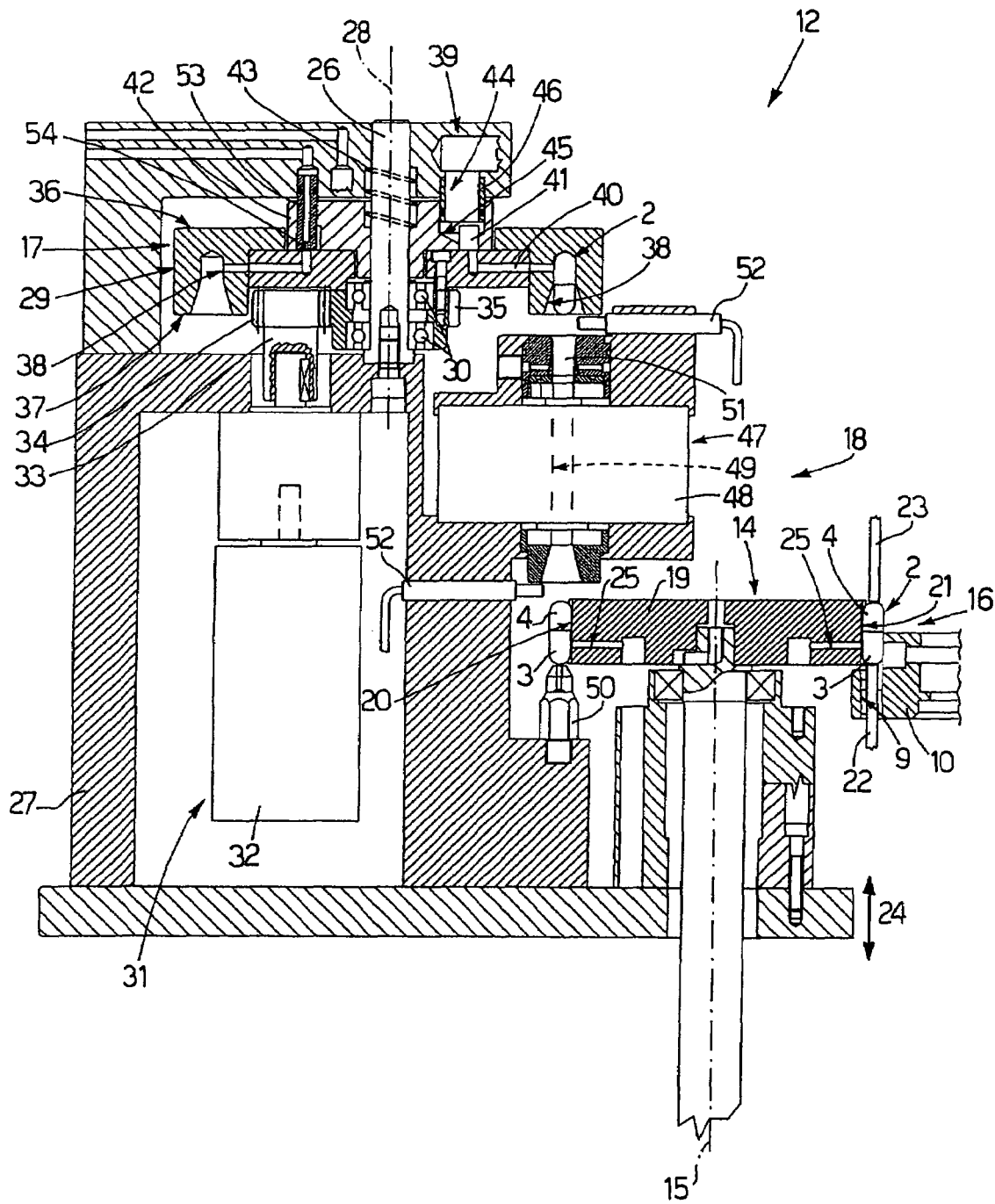
FIG. 3 shows a schematic side view, with parts in section and parts removed for clarity, of the FIG. 2 detail.

Number 1 in FIG. 1 indicates as a whole a machine for filling capsules 2 with at least one pharmaceutical product. Each capsule 2 comprises a substantially cup-shaped bottom shell 3, and a top shell 4 for closing bottom shell 3 (FIG. 3).

On machine 1, the empty capsules 2 are fed successively to an open-and-separate station 5, where the empty capsules 2 are opened, and the bottom shells 3 are picked up successively by a known conveying device 6, and are fed by device 6 along a given path T1 and through at least one filling station 7 comprising a number of known metering devices (not shown), each of which feeds a given quantity of a pharmaceutical product into a relative bottom shell 3.

Path T1 extends between open-and-separate station 5 and a closing station 8, where each bottom shell 3 is closed with a relative top shell 4 fed from station 5 to station 8 along a path T2 so designed that bottom shell 3 and top shell 4 separated at station 5 arrive at station 8 in time with each other.

Each full bottom shell 3 is closed in known manner inside a relative seat 9 on a closing wheel 10, which is mounted to rotate continuously (anticlockwise in FIG. 1) about a respective substantially vertical longitudinal axis 11 perpendicular to the FIG. 1 plane, and forms part of a device 12 for conveying the full capsules 2 from station 8 to a number of (in the example shown, three) output stations 13 described in detail below.

Figure 2:
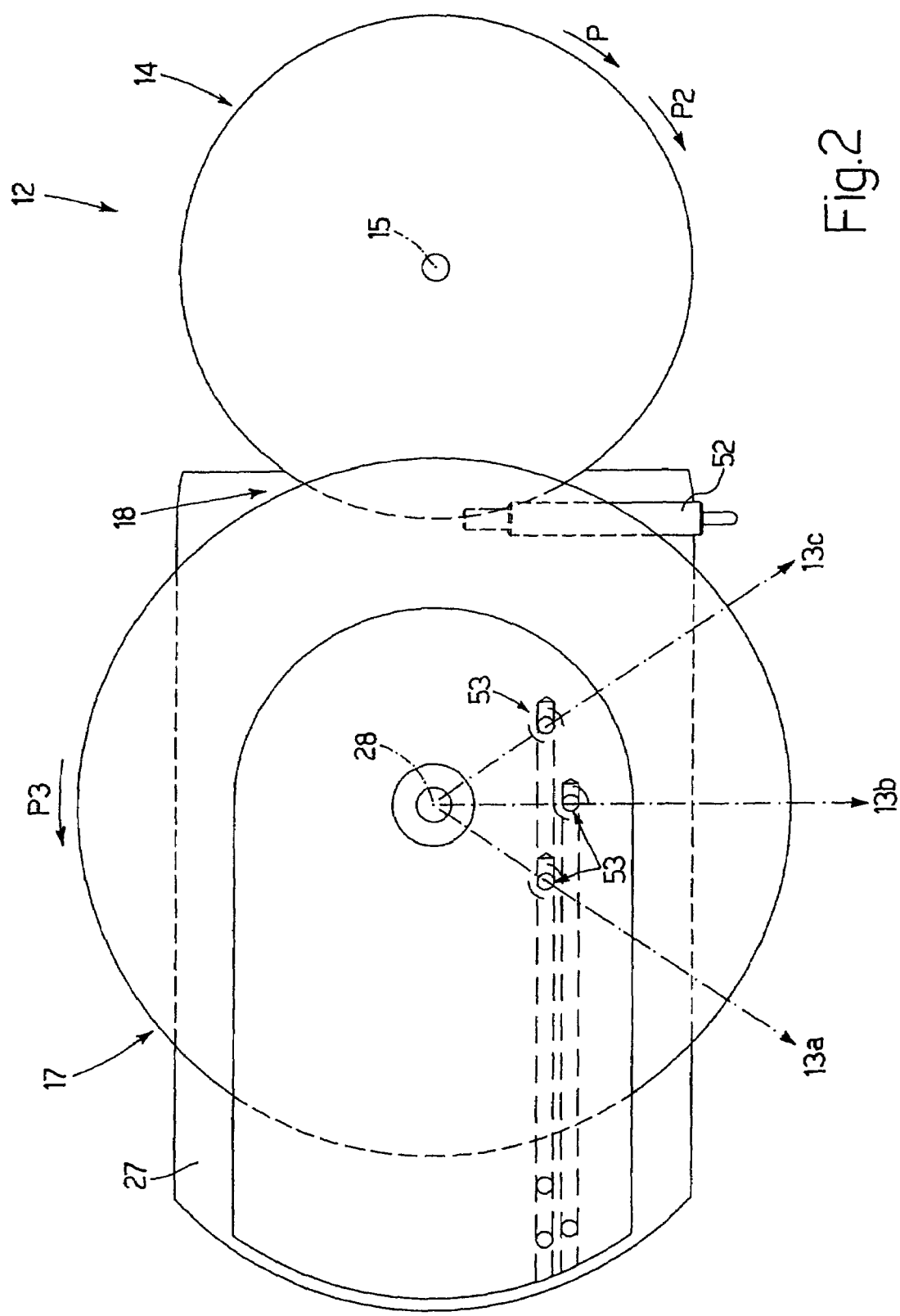
FIG. 2 shows a schematic plan view of a detail of FIG. 1.

Device 12 also comprises a first transfer wheel 14, which is mounted to rotate continuously (clockwise in FIGS. 1 and 2) about a respective longitudinal axis 15 parallel to axis 11, is connected to wheel 10 at a first transfer station 16, and is connected to a second transfer wheel 17 at a second transfer station 18.

Wheels 10, 14, 17 thus define a feed line for feeding the full capsules 2 along a given path P comprising an initial portion P1 extending between stations 8 and 16, an intermediate portion P2 extending between stations 16 and 18, and an end portion P3 extending between stations 18 and 13.

As shown in FIG. 3, transfer wheel 14 comprises a drum 19 bounded laterally by a substantially cylindrical surface 20 coaxial with axis 15, and has a number of substantially semicylindrical seats 21 formed on surface 20, parallel to axis 15, equally spaced about axis 15, and each for receiving and housing a respective full capsule 2.

Each seat 21 is fed by wheel 14 through station 16 in time with a relative seat 9 on wheel 10, so that, as the two seats travel through station 16, the combined action of a pusher 22 and a counter-pusher 23 transfers the relative full capsule 2 from seat 9 to seat 21 in a substantially vertical direction 24 parallel to axes 11 and 15.

Seats 21 normally communicate with a known pneumatic suction device (not shown) by means of respective conduits 25 formed through drum 19 and opening outwards at relative seats 21 to retain the full capsules 2 inside relative seats 21 along portion P2 of path P.

Transfer wheel 17 comprises a supporting shaft 26, which is connected to a fixed frame 27, has a longitudinal axis 28 substantially parallel to direction 24, and supports a rotary drum 29 fitted in rotary and axially-fixed manner to shaft 26, with the interposition of two ball bearings 30, to rotate, with respect to shaft 26 and about axis 28, under the control of an actuating device 31.

Device 31 comprises an electric motor 32, an output shaft 33 of which extends in direction 24, is parallel to shaft 26, and is fitted with a gear 34 meshing with a gear 35 fitted to drum 29.

Drum 29 rotates, in the example shown, parallel to and above drum 19, is bounded axially by two opposite surfaces 36, 37 substantially perpendicular to axis 28, with surface 36 located over surface 37, and comprises a number of pockets 38, which are formed in drum 29, parallel to direction 24, open outwards at surface 37, and are equally spaced about axis 28.

In a variation not shown, axes 15 and 28 are crosswise to each other, and pockets 38 are formed in the lateral surface of drum 29, parallel to direction 24, to maintain the same orientation of capsules 2 on both wheel 14 and wheel 17.

Pockets 38 normally communicate with said pneumatic suction device (not shown) by means of a pneumatic circuit 39 comprising, for each pocket 38, a respective conduit 40 formed through drum 29 and opening outwards at relative pocket 38 to retain the relative full capsule 2 inside relative pocket 38 along portion P3 of path P.

Conduits 40 also communicate pneumatically with an annular manifold 41 common to all of conduits 40 and formed in a sleeve 42, which is positioned facing surface 36, is fitted in sliding manner to supporting shaft 26, and is maintained contacting surface 36 by a spring 43 interposed between frame 27 and sleeve 42 to ensure fluidtight connection of conduits 40 and manifold 41.

Manifold 41 in turn communicates pneumatically with a conduit 44, a first portion 45 of which is formed through sleeve 42 and connected in sliding and fluidtight manner to a second portion of conduit 44 defined by a bush 46, which is fixed inside frame 27, projects inside portion 45 and is connected to said pneumatic suction device (not shown).

Transfer station 18 has a detecting device 47 comprising a known sensor 48, which is fixed to frame 27, is located between wheels 14 and 17, provides for at least determining the weight of the pharmaceutical product in each full capsule 2, and comprises a feed channel 49 formed through sensor 48, parallel to direction 24, and engaged by capsules 2 as they are transferred from wheel 14 to wheel 17.

Each seat 21 is fed by wheel 14 through station 18 so that, as the seat travels through station 18, by combining deactivation of relative conduit 25 with activation of a compressed-air nozzle 50 fixed to frame 27 and facing the inlet of channel 49, and with activation of a venturi suction channel 51 at the outlet of channel 49, the relative full capsule 2 is first unloaded from seat 21, is then fed along channel 49, and is finally fed into a relative pocket 38, which is fed by wheel 17 through station 18 with a delay with respect to seat 21 and in time with capsule 2 at the outlet of channel 49.

In connection with the above, it should be pointed out that:
each pocket 38 and relative full capsule 2 are timed by selectively controlling electric motor 32, and therefore the rotation speed of drum 29 about axis 28, as a function of signals from two optical-fiber devices 52 located at the inlet and outlet respectively of channel 49; and each pocket 38 is interconnected and timed with at least one given metering device (not shown) at filling station 7 to feedback control correct operation of each metering device (not shown) as a function of the signals from sensor 48.

On receiving relative full capsule 2, each pocket 38 is fed selectively by wheel 17 (anticlockwise in FIGS. 2 and 3) to one of the three output stations 13 (hereinafter indicated 13a, 13b, 13c) arranged successively in that order about axis 28 and along portion P3 of path P.

Each station 13a, 13b, 13c has a compressed-air nozzle 53, which extends through sleeve 42, parallel to direction 24, projects at one end inside manifold 41 and at the other end inside frame 27, is fitted in sliding and fluidtight manner to frame 27, and has an outlet hole 54 which communicates pneumatically with conduits 40 of pockets 38 as they are fed through station 13a, 13b, 13c.

In connection with the above, it should be pointed out that:
hole 54 has a cross section smaller than that of the corresponding ends of conduits 40, so that conduits 40 are connected pneumatically at all times to said pneumatic suction device (not shown); and the force exerted on capsules 2 by the compressed air fed by nozzles 53 along conduits 40 is greater than the force exerted on capsules 2 by said pneumatic suction device (not shown), thus enabling expulsion of capsules 2 from relative pockets 38.

In actual use, nozzle 53 of station 13a is activated selectively, as a function of a signal from sensor 48, to unload from relative pockets 38 any full capsules 2 of a weight differing from a given reference value; nozzle 53 of station 13b is activated selectively to periodically feed full capsules 2 to a known weighing device (not shown) to feedback control correct operation of sensor 48; and nozzle 53 of station 13c is activated at all times to unload from relative pockets 38 the full capsules 2 fed through stations 13a and 13b and of a weight substantially equal to said reference value.

Transferring full capsules 2 from seats 21 on transfer wheel 14 to pockets 38 on transfer wheel 17 therefore provides for feeding capsules 2, with precise timing and no change in orientation, along the whole of path P.

From the foregoing it will be appreciated that, although specific embodiments of the invention have been described herein for purposes of illustration, various modifications may be made without deviating from the spirit and scope of the invention.

The invention claimed is:

1. A device for conveying capsules containing at least one pharmaceutical product, the device comprising at least two conveyors for feeding said capsules along a given path, one of said conveyors being defined by a first pocket conveyor having a number of first pockets, each for housing a relative said capsule; a transfer station connecting said conveyors to one another; and a detecting device located at said transfer station to determine at least the weight of the pharmaceutical product in each said capsule; and being characterized in that the other conveyor is defined by a second pocket conveyor having a number of second pockets, each for housing a relative said capsule; transfer means transferring each said capsule from the relative first pocket to the relative second pocket with no change in orientation of the capsule.

2. A device as claimed in claim 1, wherein said path comprises a substantially vertical portion extending through said transfer station.

3. A device as claimed in claim 1, wherein said detecting device comprises at least one sensor having at least one feed channel engaged successively by said capsules as they are transferred from the first to the second pocket conveyor.

4. A device as claimed in claim 3, and also comprising actuating means for advancing each said second pocket in time with a relative said capsule issuing from said feed channel.

5. A device as claimed in claim 1, wherein said first and said second pocket conveyor are two transfer wheels mounted to rotate about respective longitudinal axes.

6. A device as claimed in claim 5, wherein said axes are substantially parallel to each other.

7. A device as claimed in claim 5, wherein said axes are substantially crosswise to each other.

8. A device as claimed in claim 1, and also comprising a closing wheel for closing said capsules and transferring the capsules successively to said first pocket conveyor.

9. A machine for filling capsules with at least one pharmaceutical product, the machine comprising a conveying device as claimed in claim 1.

10. A machine as claimed in claim 9, and also comprising at least one metering device for metering the pharmaceutical product into the capsules; and logic control means for feedback controlling the metering device as a function of a signal from said detecting device.

11. A machine as claimed in claim 9, and also comprising a number of metering devices for metering the pharmaceutical product into the capsules; each said second pocket being interconnected and timed with at least one said metering device.

* * * * *

UNITED STATES PATENT AND TRADEMARK OFFICE
CERTIFICATE OF CORRECTION

| | |
|---|---|
| PATENT NO. | : 7,328,559 B2 |
| APPLICATION NO. | : 11/519424 |
| DATED | : February 12, 2008 |
| INVENTOR(S) | : Ernesto Gamberini |

It is certified that error appears in the above-identified patent and that said Letters Patent is hereby corrected as shown below:

On the Title page add the following: (30) Foreign Application Priority Data
September 9, 2005 (EP) 05425632

Signed and Sealed this

Twenty-fifth Day of November, 2008

JON W. DUDAS
*Director of the United States Patent and Trademark Office*